(No Model.)
G. GUIGNARD & A. HÉDOUIN.
PROCESS OF AND APPARATUS FOR MANUFACTURING ALCOHOL.
No. 436,735. Patented Sept. 16, 1890.
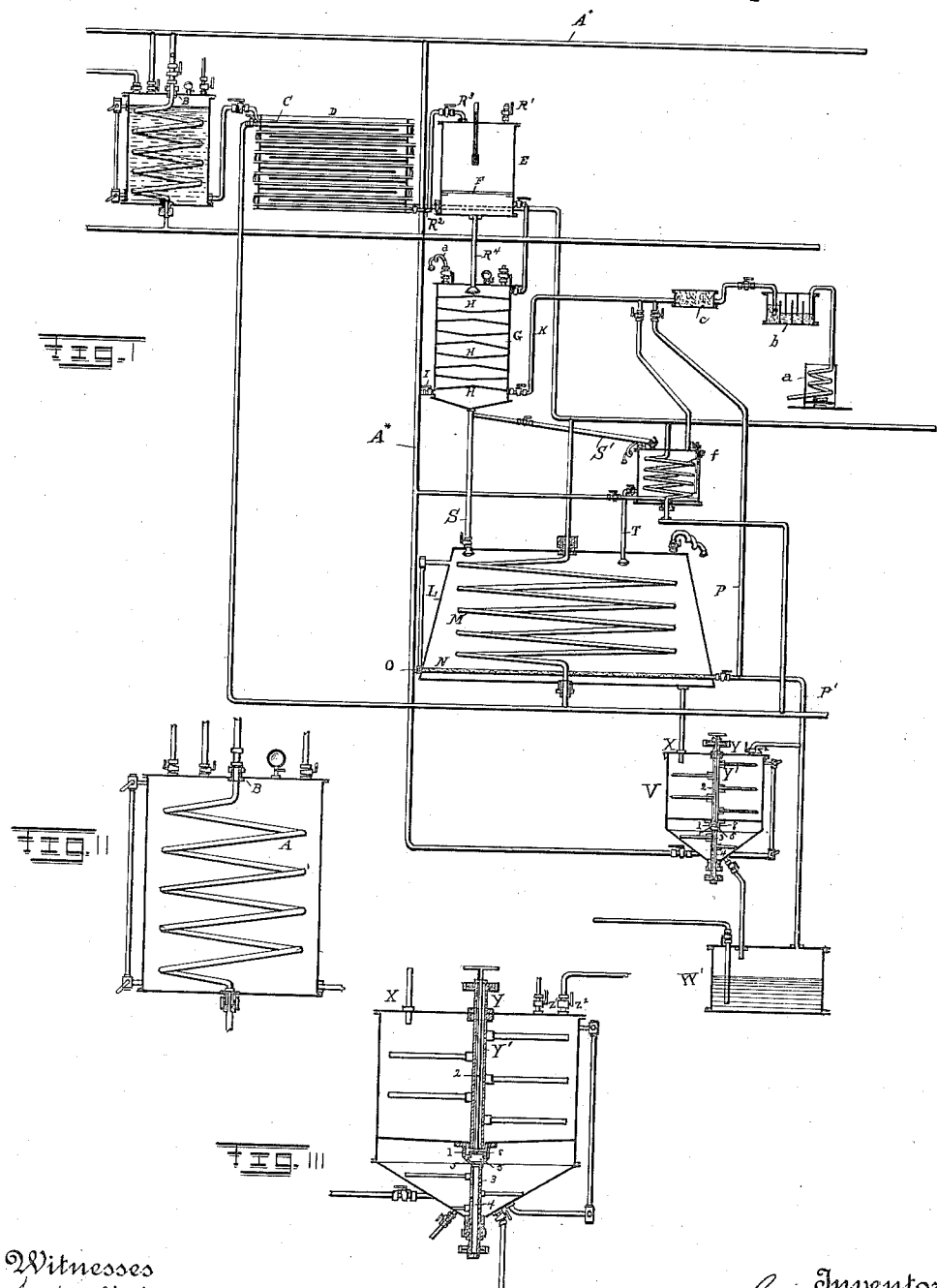

UNITED STATES PATENT OFFICE.

GASTON GUIGNARD AND ANDRÉ HÉDOUIN, OF PARIS, FRANCE.

PROCESS OF AND APPARATUS FOR MANUFACTURING ALCOHOL.

SPECIFICATION forming part of Letters Patent No. 436,735, dated September 16, 1890.

Application filed January 28, 1890. Serial No. 338,435. (No model.)

*To all whom it may concern:*

Be it known that we, GASTON GUIGNARD and ANDRÉ HÉDOUIN, citizens of the Republic of France, and residents of Paris, in said Republic, have invented certain new and useful Improvements in Processes of and Apparatus for the Manufacture of Alcohols, of which the following specification is a full, clear, and exact description.

This invention relates to the manufacture of alcohols by fermentation and distillation, and has for its object particularly the manufacture of the same in a pure state by avoiding the production with the alcohol of undesirable foreign bodies.

The divers processes heretofore employed have involved the fermenting of the juices in presence of the air, and consequently also in the presence of all the germs contained therein. If, now, the impurities in alcohols thus made (which impurities it is the object of various old and modern processes to remove in order to produce pure alcohol) be examined from a chemical point of view, it will be found that they are largely, if not wholly, produced by either the germs existing in the air or germs contained in the impure yeast employed, or germs contained in the juices or liquors to be fermented themselves. These impurities here spoken of, whose destruction or transformation is sought when the purification of alcohol is desired, are, first, aldehydes; second, homologous alcohols higher than ethylic alcohol; third, ethers; fourth, bases. It is known that the aldehydes are produced by the oxidation of the alcohols during the fermentation by the acetic ferment found in the juices or liquors to be fermented. The higher alcohols are produced, first, by the action of the butyric ferment, which decomposes or converts the sugar, the glycerine, &c., into butyric acid, butylic alcohol, carbonic acid, hydrogen; second, by the purely chemical action of the nascent hydrogen, which gives by acting on the glucose, first, mannite, and, second, the series of monatomic alcohols after $\beta$ (beta) hexylic alcohol. The organic acids contained in the juices or liquors to be fermented give rise to odorous ethers, particularly when wines or vinous liquids acidified with a mineral acid are distilled. Finally the albuminoid matters of the liquors, and even those contained in the already dead yeast-cells, give on hydration, first, acids; second, ammonias; third, amido acids. All the impurities mentioned are therefore unavoidably produced when alcohol is manufactured by the known processes, and when it is desired to purify these alcohols it is necessary to have recourse to operations more or less long and costly in order to destroy and transform them.

The new process, which constitutes the present invention, has for its prime object to avoid from the commencement of the manufacture of the alcohol the production of the impurities indicated. This being so, it will be understood that such process gives a larger yield and effects an important economy, since pure alcohols are directly manufactured. To prevent the production of the specified impurities proceeding from the presence of ferments in the air, in the juices or liquors, or in the impure yeast, as already stated, the operations are so carried on as to prevent from the commencement to the end of the manufacture the introduction of any of these hurtful ferments. The new or improved process of manufacture rests, then, on the following principles: first, sterilization of the musts; second, aeration of the musts with sterilized air; third, fermentation of the musts out of contact with unsterilized air by means of a pure yeast from the preparation of a determined and selected cell; fourth, maintenance of the temperature nearly constant during the fermentation; fifth, filtration of the wines after fermentation in filters so constructed that the liquids and the yeast which they hold remain out of contact with the air and all germs foreign to the yeast, and also for reasons to be explained hereinafter; sixth, neutralization or slight alkalization of the fermented liquors; seventh, a primary distillation of the neutral or slightly alkaline liquors; eighth, a second distillation over an acid or equivalent salt. By fermenting the sterilized musts out of contact with the air by means of a pure yeast the oxidizing action of the acetic ferment and consequently the destruction of a part of the alcohol formed is avoided. The formation also is avoided of the higher alcohols produced either by the butyric ferment or by the action on the glucose of the nascent hydrogen produced by the butyric ferment. Any notable increase of the initial acidity of the liquors is also thus prevented. By suppressing the presence of the butyric and acetic ferments the transformation is avoided of the sugar into butyric acid by the former and of a part of the alcohol into aldehyde and acetic acid by the latter ferment. The two causes of the production of acid are thus avoided, and consequently the formation of ethers is avoided also. There remains, however, a single matter of expense resulting from the life of the yeast. The albuminoid matters of the liquors, or even, as has been said, those contained in the already dead cells of yeast, give on hydration acids, ammonias, and amido acids. The acids once produced, whatever their source, give rise to ethers, particularly when wines or vinous liquids acidified with a mineral acid are distilled.

According to the present invention the wines or vinous liquids are distilled in a neutral or slightly alkaline condition in order to prevent this etherification and to destroy the ethers already formed; but as the products of an ammoniacal nature arising from the decomposition of the albuminoid matter of the yeast or of that contained in the liquors can pass over in distillation a second distillation is or may be made over an acid-salt or salt capable of forming a double salt with these bodies. For this purpose an acid-salt or salt such as sulphate of alumina may be employed.

To resume by the present invention the formation during fermentation is avoided of, first, aldehydes; second, amylic, butyric, &c., alcohol; third, a part of the acids. The production of ethers (acetates, butyrates of ethyl, &c.) during the distillation of the wines or vinous liquids is avoided by making them alkaline during that operation. Finally to keep back the ammoniacal products a second distillation of the alcohol from the former distillation is, if need be, made over an acid-salt, such as the tartrate of potash, or of soda, or over sulphate of alumina.

The following is a description of the mode of carrying the invention into effect, reference being had to the accompanying drawings, which form part of this specification, and in which—

Figure I represents in sectional elevation a general scheme of apparatus for that purpose. Fig. II is a sectional elevation, on a larger scale, of the sterilizer for must; and Fig. III, a similar detail of the filter. This apparatus also forms a part of the invention.

*Sterilization.*—Sterilization of the juices or liquors to be fermented can be obtained by one of the several known means. By preference sterilization by superheating is employed as simple and convenient. Filtration by porous walls may also be employed. The sterilization by superheating is effected by heating the liquors for twenty minutes to 125° centigrade. For this purpose the liquors are placed in a closed tank B and heated by means of a steam-coil A, supplied from the main A*. This coil may be rotated for the purpose of agitating the contents of the tank and thus maintaining an equal temperature in all parts of the same. To this end it enters the tank by a stuffing-box at the top and passes out by a packed joint at the bottom. The tank B, being closed, acts as a *monte jus.*

*Cooling.*—The sterilized juices or liquors pass through a coil C, placed in an open tank D, wherein cold water circulates in inverse direction to the movement of the juices. They are thus cooled to about 20° centigrade. The coil C is itself previously sterilized by steam. Two refrigerating apparatus may be connected. In a general way the apparatus preferred is composed of a tank D, divided by horizontal partitions which extend alternately from opposite sides nearly across the tank, and the coil C is developed flatwise in each of the horizontal compartments thus formed, suitable connection being made with the portion of the coil in the next compartment above and below. Thus a very large cooling surface is obtained.

*Filtration.*—From the coil C the liquors pass, always out of contact with the air, into a closed filter composed of the tank E, divided in two by the filtering-cloth or filtering-diaphragm F. Prior to admitting the juices or liquors the air is expelled from the tank E by steam admitted through the pipe $R^2$ from the main A*, the blow-off R' being open, and when the air has been expelled the said blow-off is closed and steam is retained in the tank under a pressure of about two kilograms for some time. Then the steam-pipe $R^2$ is closed and the pipe $R^3$ for the admission of the liquor is opened. The condensation of the steam induces the filtration of the liquor through the filtering material F.

*Aeration.*—From the filter the liquors enter the aerating-vat G, filled with sterilized air, wherein they become charged with oxygen. The aerating apparatus is composed of a vat, at the upper part of which the liquors are introduced through the pipe $R^4$, terminating at the lower end in a rose or sprinkler. They fall on a series of diaphragms H of perforated sheet metal, which present a slight inclination from center to circumference, the inclination in adjacent diaphragms being in opposite directions. The aerating apparatus communicates by the pipe I with the steam-main A* and by the pipe K with the apparatus for supplying sterilized air, (to be hereinafter described.)

*Fermentation.*—From the aerator the liquors run into the fermenting-vat L, which has been previously sterilized, and which is provided with an hydraulic joint at the top to prevent the entrance of the outside air. The vat is provided with a coil M, (movable like the coil A and similarly provided with stuffing-boxes where it passes through the top and bottom of the vat,) through which cold water may be circulated. On the bottom of the vat is a perforated pipe or distributer N, communicating at one end with the steam-main A* through the pipe O, and at the other end through the pipe P with the apparatus for supplying sterilized air. The cover of the vat is provided with a series of copper tubes Q, of small diameter, coiled into spiral form and closed each by a plug of asbestus, covered with one of cotton. There are also two pipes S and T terminating in roses or sprinklers within the vat, the former S serving for the introduction of the musts and the latter T for the pure yeast prepared outside in the small vat U of analogous construction. This yeast-vat is wholly of metal. It is first sterilized, and then a portion of the liquors from the aerator G is admitted thereinto through the pipe S'. This portion of the liquors is fertilized with yeast cultivated outside with all the necessary precautions and tested before it is used for fertilization in order to be certain of its purity. The yeast-vat is provided with an outlet T some distance from the bottom, in order that the yeast may be drawn off without disturbing the leaven in the vat, so that the preparation of the yeast may be continuous. It is or may be also provided with a pipe directly at the bottom for drawing off the whole contents. Lastly the vat U, like the fermenting-vat L, is provided with a cooling-coil, (letter $f$, in this instance,) in order to maintain the temperature constant at the desired degree. The pure yeast produced in the vat U is transferred with the liquid which has produced it through the pipe T into the sterilized fermenting-vat L, wherein it is showered with its must in the form of rain. The liquor to be fermented is then introduced through the pipe S little by little and also in the form of rain.

*Second Filtration.*—When the vat is full, fermentation is allowed to take place, and then when this is finished the vinous liquid and the vinous liquors are conducted into a special filter V, which permits the yeast to be collected out of contact with the air. This filter is constituted by a cylinder with conical bottom having its top provided, first, with an inlet X for the vinous or fermented liquors; second, at the center with a stuffing-box V, through which passes a hollow shaft Y', carrying stirring-arms; third, with an air-valve Z', and, fourth, with a valved pipe $Z^2$, communicating with the duct P' for sterilized air. In the cylinder is the filter cloth or diaphragm W, which has at center a metallic piece 1, forming a support to the shaft Y'. This piece is hollow and forms a passage for draining off the contents of the upper compartment, which passage is closed by means of a disk 8 at the lower end of a rod 2, that extends through the shaft Y' to the outside, so as to enable the valve-disk 8 to be manipulated. The liquid escapes from the hollow piece 1 through the orifice 5 in its lower part. The conical part of the filter is also provided with an agitator composed of the hollow shaft 3, having stirring-arms attached and turning about the stationary rod 4, whose upper end is fixed in the piece 1. The shaft 3 passes through a stuffing-box and is provided outside with a pulley for rotating the same.

*Centralization.*—The liquors which escape from the filter just described pass into a collecting-vessel W' and thence to the distilling-column, where they are rendered neutral or slightly alkaline. The alcohol produced by this first distillation is there distilled a second time, if necessary, over an acid-salt.

It only remains to indicate the means for effecting the sterilization of the air, the sterilization of the aerator, and the sterilization of the vats.

*Sterilization of the air.*—The air employed in the whole course of manufacture ought, as has been said, to be sterilized. It is sterilized by passage through an iron coil $a$, heated in an outside furnace. The hot air then passes into and through a vessel $b$, provided with deflecting-partitions and containing sulphuric acid, ($H_2SO_4$,) the passage through or in contact with which acid deprives the air of the last organized germs which it may still contain. From the vessel $b$ the air passes through a cotton filter $c$, and therein is delivered by appropriate pipes or ducts to the various apparatus to be supplied therewith.

*Sterilization of the aerator.*—The inlet-pipe $R^4$ and the outlet S of the liquors being closed, (as also the inlet-pipe K for the sterilized air,) and the communication of the spiral pipes $d$ with the interior of the aerator being established, steam from the pipe I is let into the aerator until all the air is expelled therefrom, whereupon the stop-cocks in the pipes $d$ are closed and the steam is maintained for from ten to fifteen minutes at a pressure of from two to two and a half kilograms. Thus the steam is shut off, the tank cools, and sterilized air is admitted through the pipe K and after a time fills the tank.

*Sterilization of the vats.*—The fermenting-vat L is sterilized by bringing water to a boil therein by means of steam through the pipe O and perforated pipe N. When the steam escapes outside and ebullition has been maintained for fifteen or twenty minutes, the supply of steam through pipe O is cut off. The same perforated pipe or distributer N communicates with the pipe P, conveying the sterilized air, and through it the sterilized air enters. The vat is then ready to receive the must.

It has been stated that pure yeast is used in the course of the improved manufacture and the means for obtaining it have been described. Inasmuch as the wines or vinous liquids have filtered through the filter W and are of a nature to furnish yeast, they leave on the filter cloth or diaphragm of the filter yeast without foreign matter. This yeast it is intended to put into commerce in the form of pure yeast as a sub-product of the improved manufacture. With this object it is washed two or three times with sterilized must, then with cold sterilized water, and finally a certain quantity of very dilute sterilized must is introduced into the filter. The agitator in the cylinder V is put in motion and the valve-disk 8 is opened, so that the yeast passes in suspension therein into the conical bottom of said cylinder. From there it is drawn off by suitable outlets, and with the must introduced into copper bottles of suitable form.

We claim herein as our invention or discovery—

1. In the manufacture of alcohol by fermentation and distillation, the improvement consisting in fermenting sterilized must with pure yeast out of contact with unsterilized air and subjecting such fermented liquor to distillation, substantially as described.

2. The process of making alcohol, consisting in sterilizing must, aerating it with sterilized air, fermenting such aerated and sterilized must with pure yeast out of contact with unsterilized air, and distilling such fermented liquor, substantially as described.

3. The process of making alcohol by subjecting must successively to superheating, cooling, filtering, aerating, fermenting with pure yeast, filtering again, and distilling, the operations from the superheating to the second filtering being carried on out of contact with unsterilized air, substantially as described.

4. The process of making alcohol by fermenting sterilized must with pure yeast out of contact with unsterilized air, separating the yeast out of contact with unsterilized air from such fermented liquor, and distilling the filtered liquor, substantially as described.

5. In the manufacture of alcohol, the improvement consisting in rendering neutral or slightly alkaline the vinous liquid from fermenting sterilized must with pure yeast out of contact with unsterilized air, and distilling off the alcohol from such neutral or alkaline liquid, substantially as described.

6. The new or improved process of making alcohol by fermenting sterilized must out of contact with air not sterilized, rendering the fermented liquid neutral or slightly alkaline, and distilling the same, substantially as described.

7. The process of making alcohol by fermenting sterilized must out of contact with air not sterilized, rendering the fermented liquor neutral or slightly alkaline, distilling off the alcohol from such neutral or alkaline liquor, and redistilling the alcohol over an acid-salt or salt adapted to combine with the ammoniacal bodies thereof, substantially as described.

8. In apparatus for fermentation and distillation, the combination of the closed fermenting-vat, the sterilizer for air, a conduit leading from the latter to the former, a sterilizer for must communicating by a pipe with said fermenting-vat, a yeast-vat between the latter and the air-sterilizer and connected with both by pipes or conduits, and another pipe for conveying liquor from the must-sterilizer to the yeast-vat, substantially as described.

9. The combination of the sterilizer for must, the aerator connected therewith by a pipe, the air-sterilizer also communicating with said aerator, the closed fermenting-vat, the pipe connecting the latter with the aerator and terminating in a sprinkler, the yeast-vat connected by pipes with the air-sterilizer and aerator, respectively, and connected with the fermenting-vat by another pipe, also terminating in a sprinkler, substantially as described.

10. The combination of the sterilizer for must, the sterilizer for air, the aerator connected with both by separate pipes, the yeast-vat connected by separate pipes with the aerator and air-sterilizer, respectively, the fermenting-vat connected by pipes with the aerator and yeast-vat, respectively, and the filter connected with the fermenting-vat, substantially as described.

In testimony whereof we have signed this specification in the presence of two subscribing witnesses.

GASTON GUIGNARD.
ANDRÉ HÉDOUIN.

Witnesses:
JOSEPH COURNIER,
R. J. PRESTON.